(12) United States Patent
Jayachandran et al.

(10) Patent No.: US 11,315,110 B2
(45) Date of Patent: Apr. 26, 2022

(54) PRIVATE RESOURCE DISCOVERY AND SUBGROUP FORMATION ON A BLOCKCHAIN

(71) Applicant: International Business Machines Corporation, Armonk, NY (US)

(72) Inventors: Praveen Jayachandran, Bangalore (IN); Apurva Kumar, Uttar Pradesh (IN); Venkatraman Ramakrishna, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 15/855,155

(22) Filed: Dec. 27, 2017

(65) Prior Publication Data

US 2019/0197532 A1    Jun. 27, 2019

(51) Int. Cl.
| | | |
|---|---|---|
| *H04L 9/32* | (2006.01) | |
| *G06Q 20/38* | (2012.01) | |
| *G06Q 20/40* | (2012.01) | |
| *H04L 9/06* | (2006.01) | |
| *H04L 9/08* | (2006.01) | |

(52) U.S. Cl.
CPC ....... *G06Q 20/3829* (2013.01); *G06Q 20/401* (2013.01); *H04L 9/0618* (2013.01); *H04L 9/0897* (2013.01); *H04L 9/3239* (2013.01); *H04L 9/3297* (2013.01); *H04L 2209/38* (2013.01); *H04L 2209/56* (2013.01)

(58) Field of Classification Search
CPC ............. G06Q 20/3829; G06Q 20/401; H04L 9/0618; H04L 9/0897; H04L 9/3239; H04L 9/3297; H04L 2209/38; H04L 2209/56

See application file for complete search history.

(56) References Cited

U.S. PATENT DOCUMENTS

| | | | | |
|---|---|---|---|---|
| 6,055,637 A | * | 4/2000 | Hudson ............... | G06F 21/6218 709/225 |
| 7,178,021 B1 | * | 2/2007 | Hanna ................. | G06F 21/6209 713/150 |

(Continued)

FOREIGN PATENT DOCUMENTS

| | | | | |
|---|---|---|---|---|
| CA | 2938758 A1 | | 2/2017 | |
| CN | 107018432 A | * | 8/2017 | ....... H04N 21/26208 |

(Continued)

OTHER PUBLICATIONS

Thomas Hardjono et al., Anonymous Identities for Permissioned Blockchains, Fraft v05—Jan. 20, 2016.

*Primary Examiner* — Neha Patel
*Assistant Examiner* — Chunling Ding (57) ABSTRACT

An example operation may include one or more of identifying a registered interest associated with a requestor on a blockchain, accessing a smart contract stored on the blockchain, determining a match between the registered interest and blockchain transaction information, determining the requestor associated with the registered interest has access permissions to access the blockchain transaction information based on access control rules, and creating a temporary bilateral smart contract including the requestor, and an owner of the blockchain transaction information, and the temporary bilateral smart contract provides permission for the requester to access the blockchain transaction information.

19 Claims, 8 Drawing Sheets

(56) References Cited

U.S. PATENT DOCUMENTS

| | | | |
|---|---|---|---|
| 10,484,343 B1* | 11/2019 | Silberman | G06F 21/6218 |
| 10,833,843 B1* | 11/2020 | Vijayvergia | H04L 9/3242 |
| 2009/0193267 A1* | 7/2009 | Chung | H04L 9/0891 |
| | | | 713/193 |
| 2011/0207107 A1* | 8/2011 | Cancilliari | G09B 5/00 |
| | | | 434/309 |
| 2015/0222606 A1* | 8/2015 | Yan | H04L 9/088 |
| | | | 713/171 |
| 2016/0350749 A1 | 12/2016 | Wilkins et al. | |
| 2017/0048217 A1 | 2/2017 | Biggs et al. | |
| 2017/0091397 A1* | 3/2017 | Shah | G16H 10/60 |
| 2017/0140375 A1 | 5/2017 | Kunstel | |
| 2017/0161829 A1 | 6/2017 | Mazier | |
| 2017/0232300 A1 | 8/2017 | Tran et al. | |
| 2017/0236094 A1 | 8/2017 | Shah | |
| 2017/0300627 A1* | 10/2017 | Giordano | G06F 21/6245 |
| 2018/0060496 A1* | 3/2018 | Bulleit | H04L 9/3268 |
| 2018/0143995 A1* | 5/2018 | Bailey | G06F 21/6218 |
| 2018/0182052 A1* | 6/2018 | Panagos | G06Q 20/308 |
| 2019/0171848 A1* | 6/2019 | Kalita | G06F 21/64 |
| 2019/0188701 A1* | 6/2019 | Parsons | G06Q 20/3827 |
| 2021/0336956 A1* | 10/2021 | Bitauld | H04L 9/3271 |

FOREIGN PATENT DOCUMENTS

| | | |
|---|---|---|
| WO | 2017027438 A1 | 2/2017 |
| WO | 2017090041 A1 | 6/2017 |

\* cited by examiner

PRIVATE RESOURCE DISCOVERY AND SUBGROUP FORMATION ON A BLOCKCHAIN

TECHNICAL FIELD

This application generally relates to blockchain access, and more particularly, to private resource discovery and subgroup formation on a blockchain.

BACKGROUND

A blockchain may be used as a public ledger to store any type of information. Although, primarily used for financial transactions, a blockchain can store any type of information including assets (i.e., products, packages, services, status, etc.). A decentralized scheme transfers authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer and verify any information. Because a blockchain is a distributed system, before adding a transaction to the blockchain ledger, all peers need to reach a consensus status.

Decentralized storage and computation and transparency are fundamental to a blockchain and smart contract technology. For example, data is available to all blockchain nodes to view and verify. Modifying a ledger state is visible to all nodes and there are scenarios where private or semi-private interaction is desirable without losing the non-repudiation property even amongst a subset of interacting parties. Blockchains and smart contracts support consensus on transactions and ledger state, which results in a non-repudiated record of events for all parties to view and verify. Sometimes entities may desire to maintain information on a ledger privately and provide access-control for other peers as well as third parties, while not losing non-repudiation by exposing such information to a trusted auditor when required. Private, access-controlled, blockchains are possible with the use of obfuscation (i.e., encryption) of information before storing it on the blockchain through a smart contract.

SUMMARY

One example embodiment may provide a method that includes one or more of identifying a registered interest associated with a requestor entity on a blockchain, accessing a smart contract stored on the blockchain, determining a match between the registered interest and blockchain transaction information, determining the requestor entity associated with the registered interest has access permissions to access the blockchain transaction information based on access control rules, and creating a temporary bilateral smart contract comprising the requestor entity, and an owner of the blockchain transaction information, and the temporary bilateral smart contract provides permission for the requester to access the blockchain transaction information.

Another example embodiment may include an apparatus that includes a processor configured to perform one or more of identify a registered interest associated with a requestor on a blockchain, access a smart contract stored on the blockchain, determine a match between the registered interest and blockchain transaction information, determine the requestor entity associated with the registered interest has permissions to access the blockchain transaction information based on access control rules, and create a temporary bilateral smart contract comprising the requestor, and an owner of the blockchain transaction information, wherein the temporary bilateral smart contract provides permission for the requestor to access the blockchain transaction information.

Another example embodiment may provide a non-transitory computer readable storage medium configured to store instructions that when executed causes a processor to perform one or more of identifying a registered interest associated with a requestor entity on a blockchain, accessing a smart contract stored on the blockchain, determining a match between the registered interest and blockchain transaction information, determining the requestor entity associated with the registered interest has access permissions to access the blockchain transaction information based on access control rules, and creating a temporary bilateral smart contract comprising the requestor entity, and an owner of the blockchain transaction information, and the temporary bilateral smart contract provides permission for the requester to access the blockchain transaction information.

BRIEF DESCRIPTION OF THE DRAWINGS

FIG. 2B illustrates an example peer node blockchain configuration, according to example embodiments.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

This application in one embodiment relates to blockchain access, and in another embodiment relates to accessing blockchain information while preserving privacy and providing a private resource discovery and subgroup formation on a blockchain.

As referred to herein, a blockchain is a distributed system consisting of multiple nodes that communicate with each other. The blockchain runs programs called chaincode (e.g., smart contracts, etc.), holds state and ledger data, and executes transactions. Transactions are operations invoked on the chaincode. Transactions typically must be "endorsed" and only endorsed transactions may be committed and have an effect on the state of the blockchain system. There may exist one or more special chaincodes for management functions and parameters, collectively called system chaincodes.

Nodes are the communication entities of the blockchain system. A "node" is a logical function in the sense that multiple nodes of different types can run on the same physical server. Nodes are grouped in trust domains and associated to logical entities that control them in various ways. Nodes may include different types such as a client or submitting-client node which submits a transaction-invocation to an endorser (e.g., peer), and broadcasts transaction-proposals to an ordering service (e.g., ordering node). Another type of node is a peer node which receives client submitted transactions, commits the transactions and maintains the state and a copy of the ledger. Peers can also have the role of an endorser, although it is not a requirement. The ordering-service-node or orderer is a node running the communication service for all nodes and which implements a delivery guarantee, such as atomic or total order broadcast to each of the peer nodes in the system when committing transactions and modifying the world state.

The ledger is a sequenced, tamper-resistant record of all state transitions of the blockchain. State transitions are a result of chaincode invocations (i.e., transactions) submitted by participating parties (e.g., client nodes, ordering nodes, endorser nodes, peer nodes, etc.) A transaction may result in a set of asset key-value pairs that are committed to the ledger as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

The chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added block represents every transaction on the chain that has come before it, making it possible to ensure that all peer nodes are in a consistent and trusted state. The chain may be stored on the peer node file system (either local or attached storage), efficiently supporting the append-only nature of the blockchain workload.

The current state of the immutable ledger represents the latest values for all keys that are included in the chain transaction log. Because the current state represents the latest key values known to the channel, it is sometimes referred to as a world state. Chaincode invocations execute transactions against the current state data of the ledger. To make these chaincode interactions efficient, the latest values of the keys may be stored in the state database. The state database may be simply an indexed view into the chain's transaction log, it can therefore be regenerated from the chain at any time. The state database may automatically get recovered (or generated if needed) upon peer node startup, and before transactions are accepted.

Access control rules can be embedded in contract logic of explicitly created subgroups to share information that is obfuscated from the rest of the network. Ideally, a validator would be able to discover information without revealing that information to the entire network and without using a trusted third party independent of the blockchain. Keeping a relationship between a validator and a resource private is often necessary for competitive reasons. In one example, sharing health records of a patient among hospitals and care providers without revealing all the hospitals a patient has visited may be necessary. Another example may be providing provenance of a diamond to prove its authenticity via a blockchain, and without revealing prior ownership relationships that may compromise competitive advantage.

In one example embodiment, a peer node may be permitted to discover data or resources stored on a blockchain, or services offered by another peer, without exposing that information or service provider's identity to other peers on the network. Also, it may be helpful to form private subgroups whose member lists are not known to peers outside those subgroups. The shared ledger can be used to record a variety of information whose attributes need to be kept private, such as information about a real-world entity, identified by some entity identifier (ID), including but not limited to a person name, social security number (SSN), address, affiliations, asset or resource information, etc.

In a privacy-preserving blockchain, the contract logic of a smart contract validates a process and parameters involved in a transaction. The actual data is opaque to non-submitting validators unless they can decrypt the information. An anonymous resource or service discovery process on such a privacy-preserving blockchain may assist with healthcare, hospitals, insurance companies, patients and other enterprise organization entity types. In one example, a user may share information about patient history, validate medical procedures to avoid repetition, validate insurance claims, etc. Privacy constraints may include patient information being confidential, and hospitals may not want to reveal to third parties their relationships with particular patients.

In another example, the know-your-customer (KYC) standardization efforts may include blockchain participants, such as banks, utilities, auditors, customers, etc., which require sharing and validating identity and asset data on customers for future monitoring purposes. Privacy constraints may include banks not wanting to reveal customer lists to their competition. Provenance of goods and minerals (e.g., diamonds), and blockchain participants, such as merchants, producers, distributors may require a record trail of discovered and manufactured goods, however, in a matter of privacy, merchants may not want to reveal the sources of goods to their competition. Submitting information to a blockchain reveals a validator's relationship with to all other validators on the network. For example, a hospital or insurance company's relationship with a patient, an organization's relationship with a customer, a merchant's relationship with a source of products or goods, are all instances requiring privacy.

The blockchain transaction information may be recorded in a way that keeps identities and/or attributes private. The information can be shared selectively with other validators upon request. For example, another hospital in a different city may require access to a patient medical history in an urgent manner and only for a specific health management purpose unrelated to the majority of information associated with the patient. Another example is an institution may require KYC information for a particular customer to setup a new account. Subject to certain access control rules, the original recording party may permit the interested party access without permitting the rest of the network similar access. The access of the information can produce private subgroups whose memberships are known only to belonging members. For example, an owner of a product may store obfuscated resource information on the blockchain, and decryption keys off the blockchain.

In operation, a requestor may seek resource information from whoever may own or have originated such information. The requestor registers an interest on the blockchain and a smart contract detects a match between the expressed interest and certain stored information identified via an audit procedure. The smart contract may also determine whether the requestor has access permissions to the information. The smart contract may be referred to as a system contract, which manages access rules. An application contract mediates the recording and retrieval of resources and attributes. A temporary bilateral contract involving the owner and the requestor may be launched dynamically and the owner's encryption keys may be shared with the requestor. The requestor may terminate the contract after extracting the keys and accessing the information in a one-time use approach.

An application contract may be used to validate, store, exchange, and/or audit, information, resources, or services, with obfuscated information attributes. For example, when processing and collecting shared KYC information of customers. Also, a system contract may be used to maintain access control rules dictating what information/service an owner is willing to share and with which parties. For example, an institution #1 may be willing to share KYC information on customers of a particular location only with institutions #2 and #3, and KYC info on a different customer set of locations with only institution #4. A bilateral service-exchange of contracts may be performed to dynamically create and destroy/revoke contracts which permit an owner to share service/data/keys with requestors. A temporary bilateral contract is created and destroyed by the "system" contract. Exchanges happen within the scope of these bilateral contracts.

Application contracts are specifically deployed for the management of a single resource or a group of resources. Applicant contracts store resource and attribute information, possibly after validating the information, and offer the stored information either in an as-is format, or after some processing, either to third parties or to auditors. In addition, they can be used to express interest in a particular resource attribute. The scope of an application contract does not extend beyond the resources it was designed to manage. In some cases, the application contracts may be short-lived, if there is no further need to manage those resources on the blockchain.

System contracts are eternal in the lifetime of a blockchain, and are not scoped by particular groups of resources. A system contract in a blockchain runs at a "lower" level than an application contract, and manages access rules for all peers and resources with the resource attributes being obfuscated. The system contracts also have extra privileges, such as the ability to launch dynamic bilateral contracts for owner-requestor exchanges.

A bilateral contract is short-lived and ad hoc, and differs from both application and system contracts in that it is private to just the requestor and resource owner rather than involving the entire blockchain. The data being exchanged (i.e., decryption keys) can themselves be encrypted using knowledge only known to the recipient (e.g., using a public key known to the owner and a private key known only to the requestor). ECert/TCert mechanisms available can be used for this purpose. The data can be exchanged in private "channels" or separate private ledgers shared only by the two transacting parties.

Certain rules may be used to record data/resources/service offerings in an obfuscated form. The contract validates processes and completeness. Data is encrypted, though metadata and relationships among data may be in a plain text format to enable validation and to permit network blockchain peers to express interest in a particular resource via a user/resource ID, resource/service type, etc. The system contract may maintain access rules for each party, stating what other parties are permitted to access for which resource information. This permits dynamic updates of access control rules, which can trigger dynamic deployment and termination of contracts. The process may detect a "find" request through an event and identify a potential owner that matches the requestor's interest and which is willing to share information/service with the requestor. This may be a user process, such as a GUI, that detects and responds to an event containing an interest. The matching is attempted by the system contract. As a result, a bilateral contract(s) may be initiated between a candidate owner(s) and a requestor, which terminates (purges) after its lifecycle completes. At the end of the process, the requestor joins a subgroup of peers who have access to the information being sought by the requestor. The matching procedure is designed to keep peer/resource relationships private. The system contract ensures this privacy feature by using anonymous transaction certificates, which are dynamically generated for access control and to unlink peer identity from a transaction. The contract maintains access control rules based on the certificate access to particular resources. Peers can update access control lists by adding or removing certificates that guard access to a particular resource.

In certain embodiments, a party other than the resource "owner" (e.g., a hospital's stored patient record, an institution's stored customer bank's customer) may be used to set an access control rule by supplying a list of certificates corresponding to the authorized parties. Using a matrix of access control rules, the peers may specify in a plain text settings configuration which parties can access the obfuscated information. The matching procedure involves identifying which peer owns the data where the metadata matches the requestor's expressed interest and has a rule permitting the requestor access to such data. For example, a peer 'P1' may request information about 'S', and bilateral contracts are created by matching the request against access control rules in a matrix. For instance, <P1, P2>, <P1, P4>, <P1, P5>, <P1, P9>, etc., provides that another peer P3 can guess that one or more of {P2, P4, P5, P9} possess info about 'S', but cannot prove that any of those parties actually have such information. If, however, P4 changed its access control rule just after P1's request was broadcast on the network, that may indicate that P4 possesses the information sought. Although, since access control rules can be updated at any time, the simple action of updating a rule does not conclusively prove possession of information.

With a bilateral contract, there are generally only two participants including a requestor and a candidate, such as a peer that has been matched with the requestor and its interest by the system contract. The candidate may or may not possess the relevant information, a match is not guaranteed to succeed if the system contract relies on an access control matrix. The candidate may or may not wish to share the information, if the candidate is an owner and wishes to share information then the owner records service information/data/decryption keys on the blockchain through this particular contract. The requestor reads the keys and stores them in its off-blockchain store. Otherwise, the owner records the denial, which the requestor duly notes and the contract is terminated after the exchange of service or denial. In summary, the discovery of obfuscated information or resources on a blockchain without publicly revealing the identity of the owner without using a third party may provide trust and privacy.

Figure 1A:
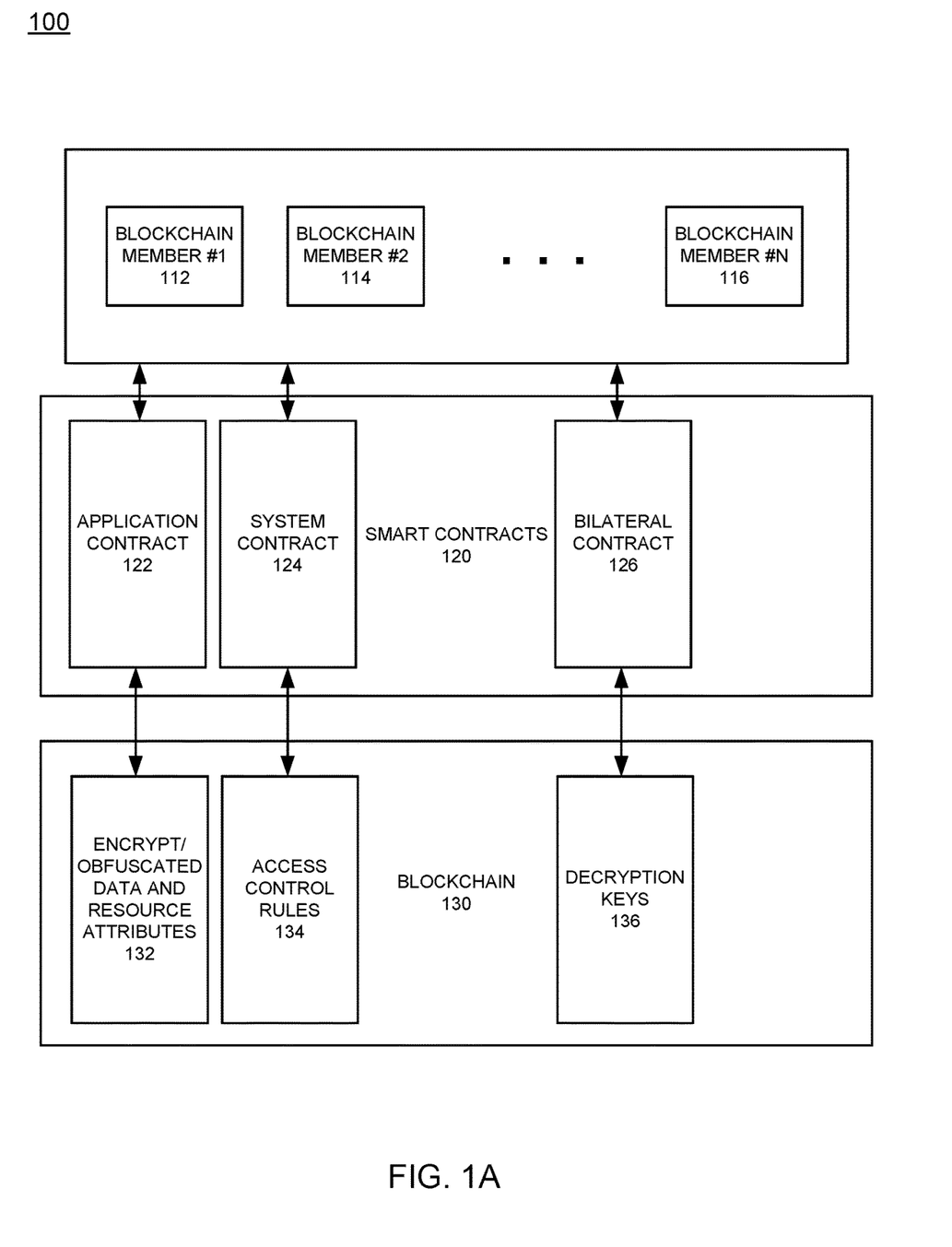
FIG. 1A illustrates a logic diagram of a blockchain smart contract cycle, according to example embodiments.

FIG. 1A illustrates a logic diagram of a blockchain smart contract cycle, according to example embodiments. Referring to FIG. 1A, the configuration example 100 includes a set of blockchain members 112-116 which may be parties to one or more application contracts 122, system contracts 124 and/or bilateral contracts 126 which are created to accommodate an information access operation. Any of the smart contracts 120 may be modified, temporary and/or customized to automatically identify information which is accessible/not accessible to third parties, authorized parties and terms for accessing such information. The blockchain 130 may store the contract information and may also store the obfuscated information 132 which is not accessible or recognizable to unauthorized parties which do not have the decryption keys. The access control rules 134 may be required to be satisfied prior to accessing the privileged information. Also, decryption keys 136 may be dispatched to an authorized party setup to access the information via a bilateral contract agreement, which can automatically establish parties and rules for accessing information in a temporary capacity (e.g., time expiration, one-time access), upon the expiration of which the agreement will be revoked. The rules for accessing the blockchain data of interest may be defined by the access control rules 134.

Figure 1B:
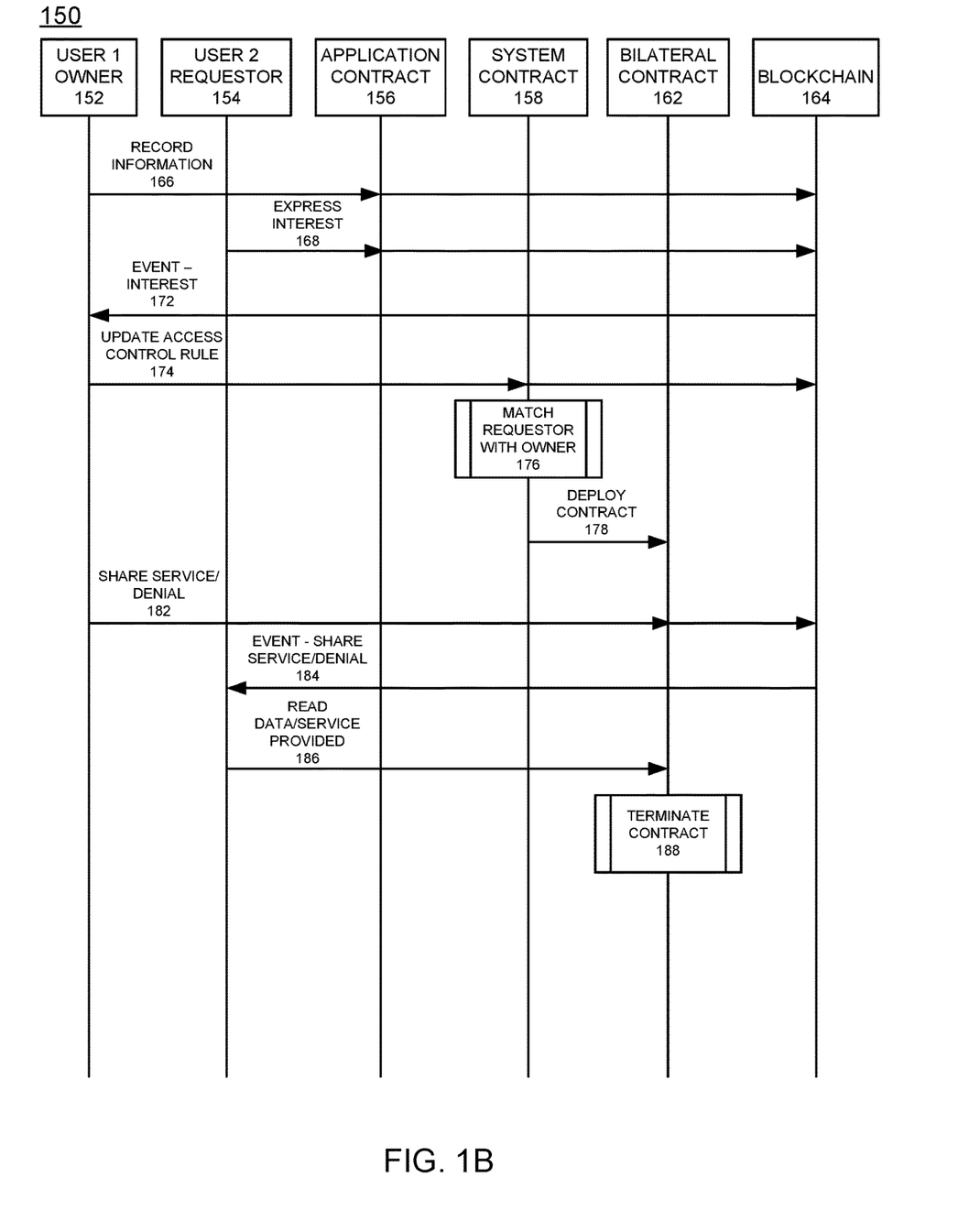
FIG. 1B illustrates a system signaling diagram of interactions among blockchain entities accessing interest information, according to example embodiments.

FIG. 1B illustrates a system signaling diagram of interactions among blockchain entities accessing interest information, according to example embodiments. Referring to FIG. 1B, the diagram 150 includes a user 1-152 as a registered owner of the information sought by user 2-154, the requestor. The application contract 156 may be a first source of communication to establish the type of terms which apply to the information (i.e., private, public, key needed, etc.). The owner may seek to record the information 166 in the blockchain 164 using application contract 156 and subsequently, the requestor 154 may express an interest 168, which is recorded as another transaction in the blockchain 164. The interest event 172 may be identified as an update event which requires an update to the access control rule(s) 174, which is stored in the system contract 158.

It is possible that the requestor already had permissions to access the resource, as per the access control rules managed by the system contract. In that case, an "update access control" operation 174 is not required, and "User 1" may simply ignore event 172. All that happens in this scenario is that the system contract 158 runs the match 176 when it sees the event, and then runs "Deploy Contract" 178 if the match succeeds. The system contract may automatically invoke a match operation which matches the requestor to the relevant information and its owner 176. The agreement may then result in a bilateral contract 162 between the owner and the requestor to be deployed 178. The owner may confirm the share service/denial 182 which enacts/disables the bilateral contract depending on the decision rendered and stores the results in the blockchain 164. The requester 154 is notified of the decision 184, and if the decision is affirmative, the requestor 154 may read the data service 186 by applying one or access credentials, such as encryption keys to the content of the blockchain transaction(s) used to record information 166. The contract may then terminate in due course 188 and the rights are revoked or result in the requestor being added to a group of members with shared access rights to the data of interest. The "groups" are implicit in the process of resource/information discovery. The process of expanding the zone of access, by adding an access control rule allowing a particular requestor to access a particular piece of information, implicitly creates a sub-group of peers that have access rights to that information, and other peers in the blockchain network are not provided with such access rights.

Figure 2A:
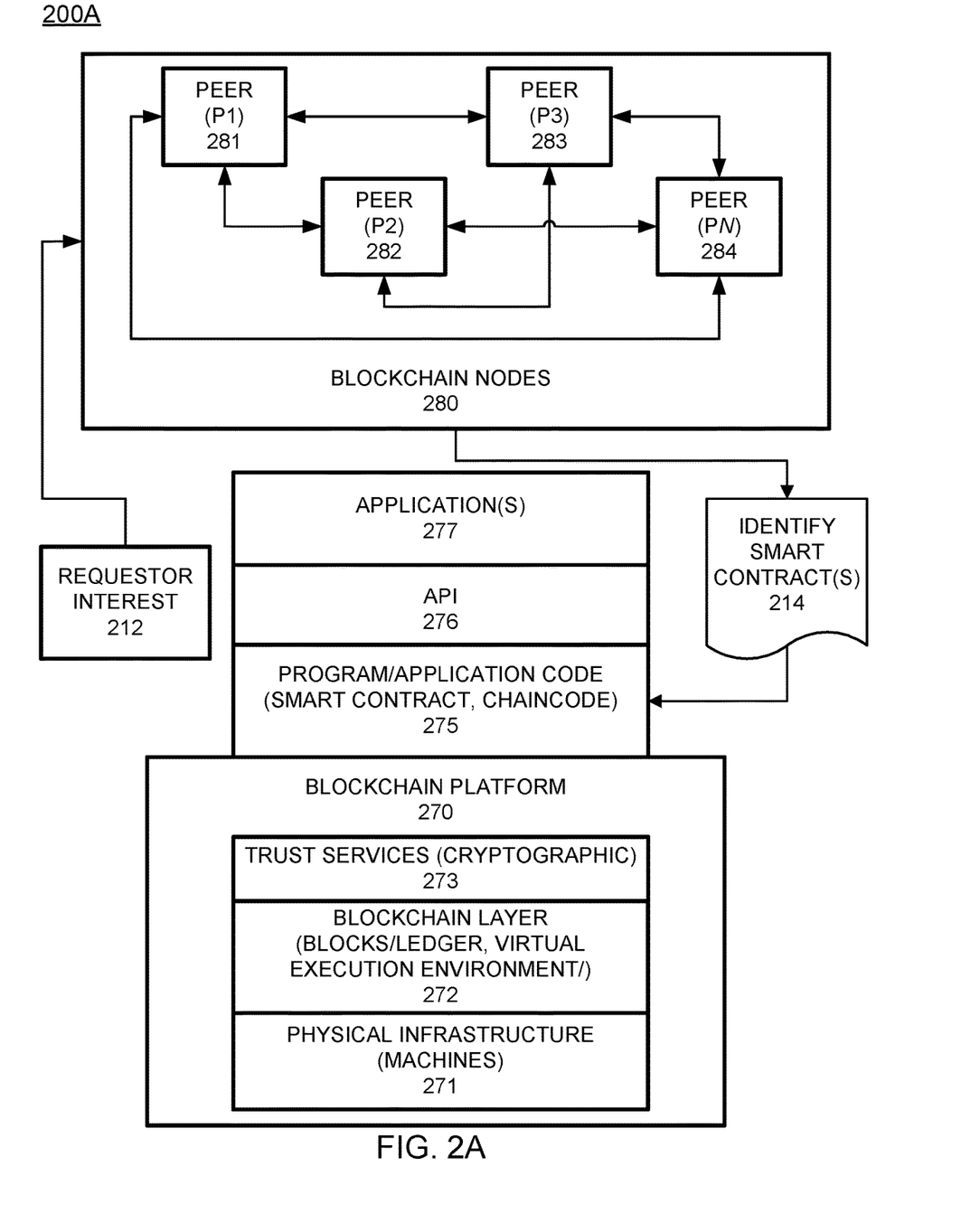
FIG. 2A illustrates an example blockchain configuration for performing an interest information access cycle, according to example embodiments.

FIG. 2A illustrates an example blockchain configuration for performing blockchain information access according to example embodiments. Referring to FIG. 2A, the blockchain system 200A may include certain common blockchain elements, such as a group of blockchain nodes 280, which may be assigned peer blockchain nodes 'peer nodes' 281-284, which participate in the blockchain transaction addition and validation process (consensus). Any of the blockchain peer nodes 280 may initiate new transactions and seek to write to the blockchain immutable ledger 272, a copy of which is stored on the underpinning physical infrastructure 271 of the blockchain 270. In this configuration, the customized blockchain configuration may include one or applications 277 which are linked to APIs 276 to access and execute stored program/application code (e.g., chain code and/or smart contracts) 275, which are created according to the customized configuration sought by the participants and can maintain their own state, control its own assets, and receive external information. This code can be deployed as a transaction and installed, via appending to the distributed ledger, on all blockchain peer nodes.

The blockchain platform 270 includes the various layers of blockchain data, services (e.g., cryptographic trust services, virtual execution environment), and underpinning physical computer infrastructure necessary to receive and store new transactions and provide access to auditors, which are seeking to access data entries. The blockchain layer 272 exposes an interface that provides access to the virtual execution environment necessary to process the program code and engage the physical platform 271. Cryptographic trust services 273 are used to verify transactions and maintain private information.

The blockchain configuration of FIG. 2A may process and execute program/application code 275 by way of the interfaces exposed, and the services provided, by blockchain platform 270. The code may control blockchain assets, for example, it can store and transfer data, and may be executed by the blockchain, for example, in the form of a smart contract and associated chain code with conditions or other code elements subject to its execution. The smart contracts 275 may be created to execute reminders, updates, and/or other notifications subject to the changes, updates, etc. The smart contracts can themselves be used to identify rules associated with authorization and access requirements and usage. In one example, a requestor interest 212 may be identified by the peer nodes 280. The nodes may identify the interest and register the information on the blockchain. Also, a blockchain smart contract identification procedure 214 may be performed to identify the terms for data access along with requirements, and/or parties registered to access such data.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

FIG. 2B illustrates an example of a transactional flow 200B between nodes of the blockchain in accordance with an example embodiment. Referring to FIG. 2B, the transaction flow may include a transaction proposal sent by an application client node 201 to an endorsing peer node 281. The endorsing peer 281 may verify the client signature, and execute a chaincode function to simulate the transaction. The output is the chaincode results, a set of key/value versions that were read in the chaincode (read set), and the set of keys/values that were written in chaincode (write set). The proposal response gets sent back to the client 201 along with an endorsement signature. The client assembles the endorsements into a transaction payload and broadcasts it to an ordering service node 284. The ordering service node 284 then delivers ordered transactions as blocks to all peers 281-283 on a channel. Before committal, each peer 281-283 may validate the transactions. For example, they may check the endorsement policy to ensure that the correct allotment of the specified peers have signed the results, and authenticate the signatures against the transaction payload.

Referring to FIG. 2B, in step 291 the client node 201 initiates the transaction by constructing and sending a request to the peer node 281 which is an endorser. The client 201 may include an application leveraging a supported software development kit (SDK) such as Node, Java, Python, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over gRPC) and take the client's cryptographic credentials to produce a unique signature for this transaction proposal.

In response, the endorsing peer node 281 may verify (a) that the transaction proposal is well formed, (b) the transaction has not been submitted already in the past (replay-attack protection), (c) the signature is valid, and (d) that the submitter (client 201, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In step 292, the set of these values, along with the endorsing peer node's 281 signature is passed back as a proposal response to the SDK of the client 201 which parses the payload for the application to consume.

In response, the application of the client 201 inspects/verifies the endorsing peers signatures and compares the proposal responses to determine if the proposal response is the same. If the chaincode only queried the ledger, the application would inspect the query response and would typically not submit the transaction to the ordering service 284. If the client application intends to submit the transaction to ordering service 284 to update the ledger, the application determines if the specified endorsement policy has been fulfilled before submitting (i.e., did peer nodes necessary for the transaction both endorse). Here, the client may include only one of multiple parties to the transaction. In this case, each client may have their own endorsing node, and each endorsing node will need to endorse the transaction. The architecture is such that even if an application chooses not to inspect responses or otherwise forwards an unendorsed transaction, the endorsement policy will still be enforced by peers and upheld at the commit validation phase.

After successful inspection, in step 293 the client 201 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation; it may simply receive transactions from all channels in the network, order them chronologically by channel, and create blocks of transactions per channel.

In step 294, the blocks of the transaction are delivered from the ordering node 284 to all peer nodes 281-283 on the channel. The transactions within the block are validated to ensure endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as notification of whether the transaction was validated or invalidated.

Figure 3:
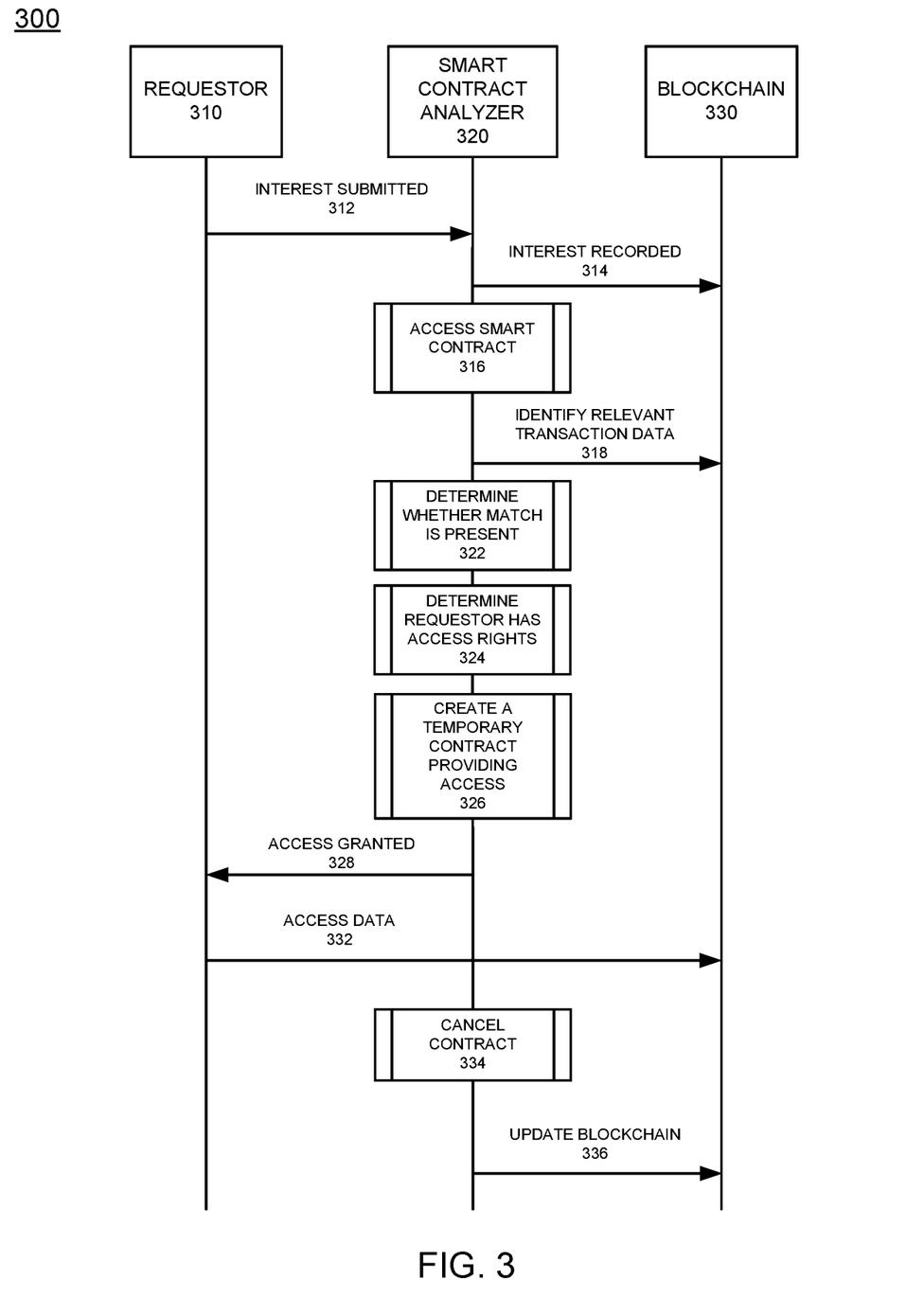
FIG. 3 illustrates a system messaging diagram for performing an interest information access cycle, according to example embodiments.

FIG. 3 illustrates a system messaging diagram for performing an interest information access cycle, according to example embodiments. Referring to FIG. 3, the configuration 300 may provide a requestor 310 submitting an interest 312 to be reviewed, examined, and committed/recorded 314 to the blockchain 330. The smart contract analyzer 320 may represent a software module of a computing platform, such as a virtual computing platform or other processing platform, which may retrieve and execute code to access a smart contract 316. The smart contract may dictate an audit/ monitor function that reviews the interests and whether there is any relevant data 318 stored in the blockchain. During the monitor cycle, there may be a match 322, a determination as to whether the requestor has the rights needed to access the data 324 and the creation of invocation of the temporary bilateral agreement 326 granting access to the data. The access may be granted 328 and the requestor may then receive decryption keys to access the data 332. The access operation or time or a function of other limiting variables may cause the contract to be cancelled/revoked 334, and the blockchain may be updated accordingly 336.

Figure 4A:
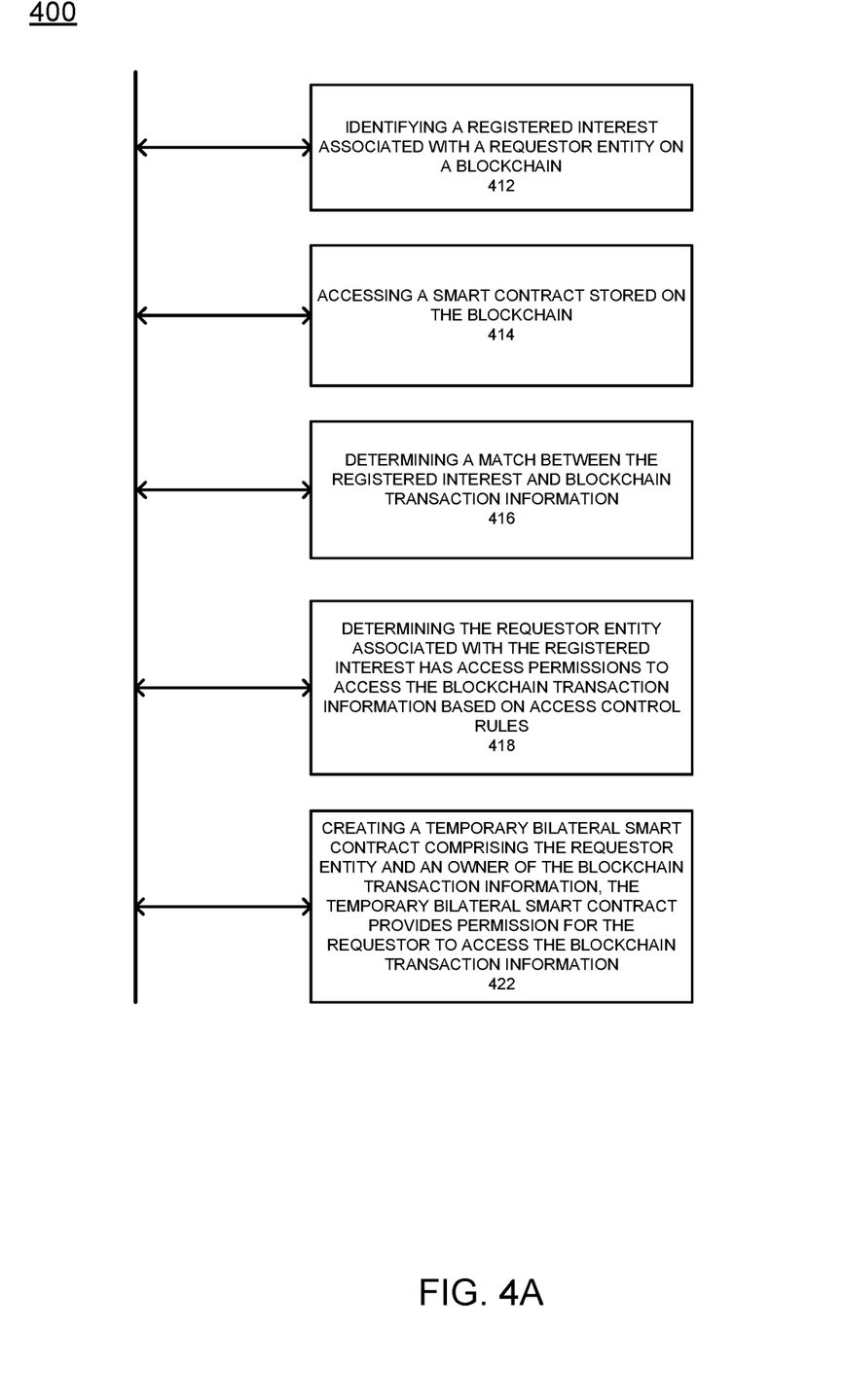
FIG. 4A illustrates a flow diagram of an example method of performing an interest information access cycle, according to example embodiments.

FIG. 4A illustrates a flow diagram of an example method of performing an interest information access cycle, according to example embodiments. Referring to FIG. 4A, the method 400 may include identifying a registered interest associated with a requestor entity on a blockchain 412, accessing a smart contract stored on the blockchain 414, determining a match between the registered interest and blockchain transaction information 416, determining the requestor entity associated with the registered interest has access permissions to access the blockchain transaction information based on access control rules 418, and creating a temporary bilateral smart contract comprising the requestor entity, and an owner of the blockchain transaction information, where the temporary bilateral smart contract provides permission for the requester to access the blockchain transaction information 422.

The method may also include forwarding a decryption key to the requestor entity, responsive to determining the requestor entity has permissions to access the blockchain transaction information. The decryption key is stored off the blockchain. The access control rules required for accessing the blockchain transaction information are stored in the system contract. The blockchain transaction information is obfuscated before being stored on the blockchain based on a policy stored in the smart contract. If the contract, such as an application itself manages the obfuscation, the information is automatically revealed in plain view to all the peers. The information is obfuscated "before" it reaches the application contract, as per a policy determined offline by the user who requests the recording of that information. The method may also include terminating the bilateral contract after the requestor entity accesses the blockchain transaction information, receiving an interest from the requestor entity, and registering the interest as the registered interest on the blockchain. The different operations are performed by different contracts.

Figure 4B:
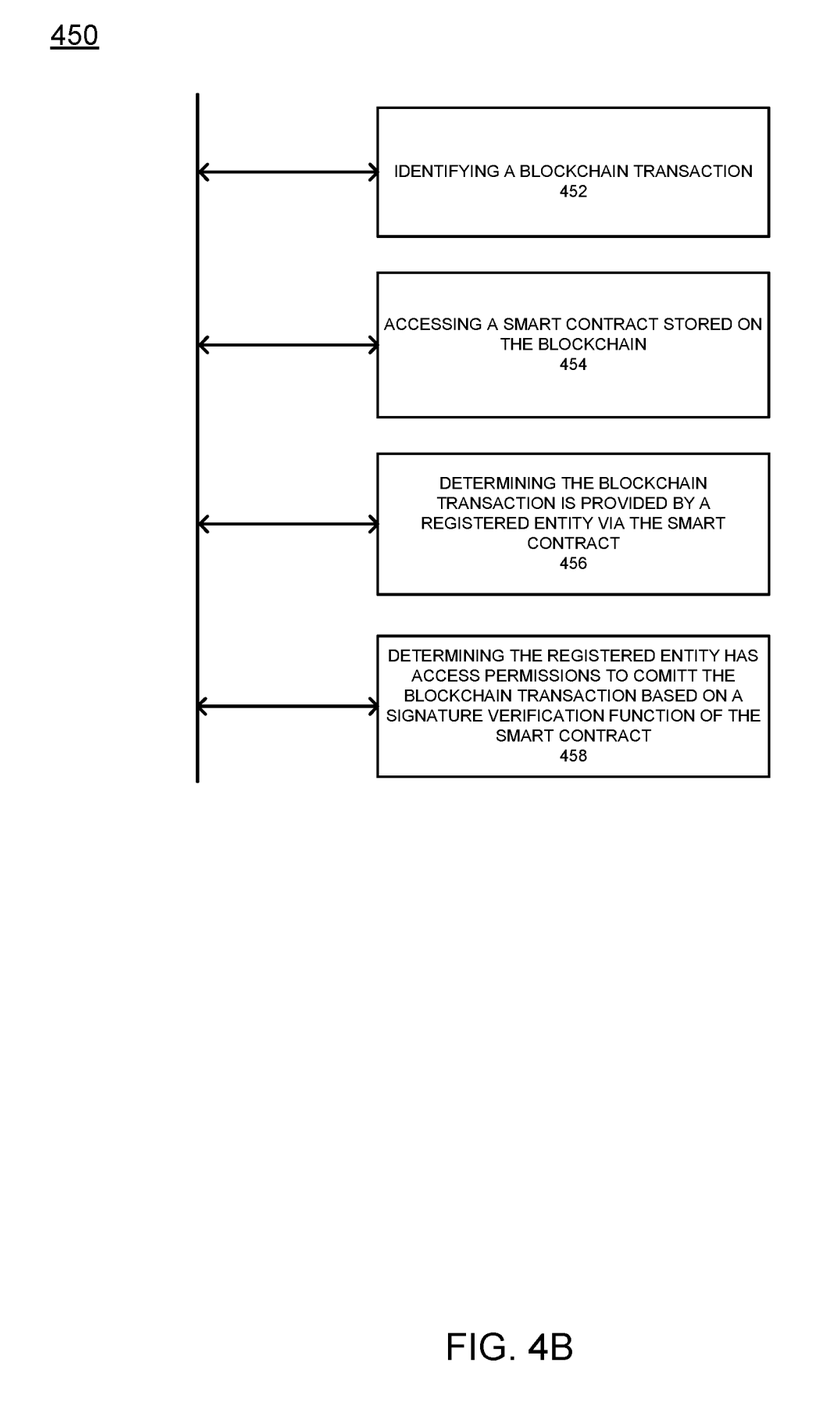
FIG. 4B illustrates another flow diagram of an example method of performing an interest information access cycle, according to example embodiments.

FIG. 4B illustrates another flow diagram of an example method of performing an interest information access cycle, according to example embodiments. Referring to FIG. 4B, the method 450 may include identifying a blockchain transaction 452, accessing a smart contract stored on the blockchain 454, determining the blockchain transaction is provided by an registered entity via the smart contract 456, and determining the registered entity has access permissions to commit the blockchain transaction based on a signature verification function of the smart contract 458.

In this embodiment, the smart contact can also be used to verify party identification during a blockchain transaction, which ensures that the party writing the transaction is using a signature key that is identified by the smart contract ahead of time to avoid disruptions. This also enables parties to remain anonymous and preserve secrecy by using a known key and not requiring personal identification information to be shared or divulged during a blockchain transaction. One approach is to write to a log file for every instance of a blockchain in a network. The log may be monitored for an event. Accordingly, every time a smart contract is updated by any of the accounts on any of the blockchain instances in the network, an event is generated, triggering the cache to load the new state of the smart contract. Each party may have a single dedicated node, and is issued one private key which resides on the node. In this model, the one private key on the node is used both to sign blockchain transactions, as well as for encryption and decryption of smart contract data. Data will therefore be available in decrypted form on the node, and the node is for only a single party with multiple users. The smart contract will be able to validate that the data provided was signed with the user private key by verifying the signature in the data that was sent to the smart contract. In this approach, another party or user can check that the data was provided by the correct user, even though that user did not directly sign the blockchain transaction. If the user sending the data wishes to remain anonymous, then the signature validation may occur off-chain.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

Figure 5:
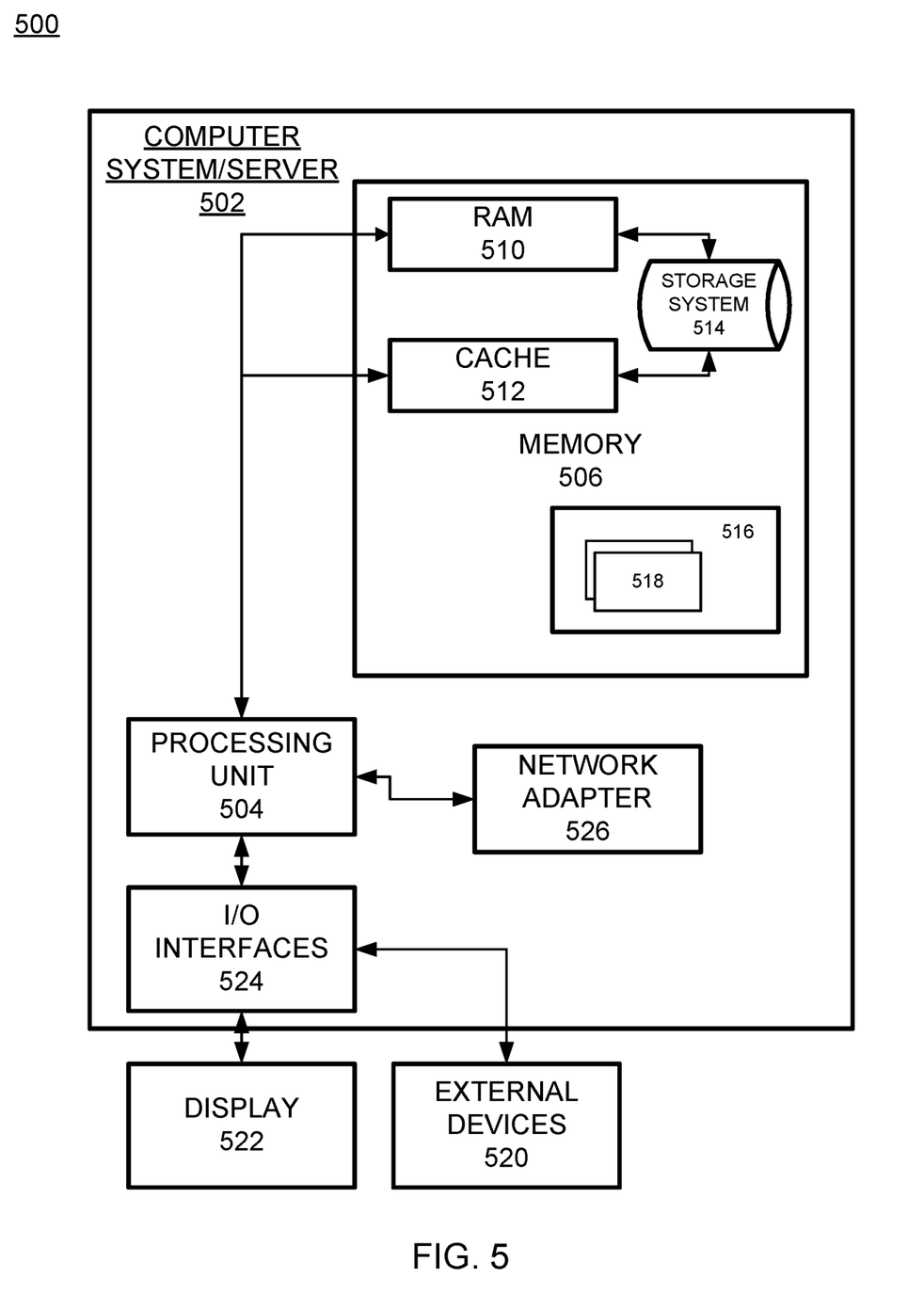
FIG. 5 illustrates an example computer system/server configured to support one or more of the example embodiments.

FIG. 5 is not intended to suggest any limitation as to the scope of use or functionality of embodiments of the application described herein. Regardless, the computing node 500 is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units 504, a system memory 506, and a bus that couples various system components including system memory 506 to processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   receiving a request from a requestor for data of a resource stored on a blockchain;
   determining, via a system smart contract running on a blockchain network of the blockchain, a blockchain peer, from among a plurality of blockchain peers of the blockchain network, which comprises encrypted data corresponding to the data of the resource requested by the requestor based on a resource identifier included in the request;
   determining, via the system smart contract, that the requestor has permission to access the encrypted data based on access control rules that are embedded within logic of the system smart contract;
   dynamically creating, via the system smart contract, a temporary ad hoc smart contract for the requestor and the determined blockchain peer only from among the plurality of blockchain peers which provides temporary access to a decryption key of the blockchain peer to the requestor to enable the requestor to decrypt the encrypted data from the blockchain peer;
   installing the temporary ad hoc smart contract on the blockchain peer; and
   terminating the temporary ad hoc smart contract in response to the requestor receiving the decryption key.

2. The method of claim 1, further comprising:
   forwarding the decryption key to the requestor, responsive to determining the requestor has access permissions to access the encrypted data.

3. The method of claim 1, further comprising storing the decryption key off the blockchain.

4. The method of claim 1, wherein the access control rules are based on anonymous transaction certificates which manage access to resources stored on the blockchain.

5. The method of claim 1, wherein the encrypted data is encrypted before being stored on the blockchain based on a policy stored in the smart contract.

6. The method of claim 1, further comprising:
   registering the request from the requestor on the blockchain.

7. The method of claim 1, further comprising:
   updating the access control rules embedded in the logic of the system smart contract to add an access control rule to allow the requestor to access the encrypted data.

8. An apparatus, comprising:
   a processor configured to:
   receive a request from a requestor for data of a resource stored on a blockchain;

determine, via a system smart contract running on a blockchain network of the blockchain, a blockchain peer, from among a plurality of blockchain peers of the blockchain network, which comprises encrypted data corresponding to the data of the resource requested by the requestor based on a resource identifier included in the request;

determine, via the system smart contract, that the requestor has permission to access the encrypted data based on access control rules that are embedded within logic of the system smart contract;

dynamically create, via the system smart contract, a temporary ad hoc smart contract for the requestor and the determined blockchain peer only from among the plurality of blockchain peers which provides temporary access to a decryption key of the blockchain peer to the requestor to enable the requestor to decrypt the encrypted data from the blockchain peer;

install the temporary ad hoc smart contract on the blockchain peer; and terminate the temporary ad hoc smart contract in response to the requestor receiving the decryption key.

9. The apparatus of claim 8, wherein the processor is further configured to forward the decryption key to the requestor, responsive to a determination that the requestor has access permissions to access the encrypted data.

10. The apparatus of claim 8, wherein the processor is further configured to store decryption key off the blockchain.

11. The apparatus of claim 8, wherein the access control rules are based on anonymous transaction certificates which manage access to resources stored on the blockchain.

12. The apparatus of claim 8, wherein the encrypted data is encrypted before being stored on the blockchain based on a policy stored in the smart contract.

13. The apparatus of claim 8, wherein the processor is further configured to register request on the blockchain.

14. A non-transitory computer readable storage medium storing instructions that when executed causes a processor to perform a method comprising:

receiving a request from a requestor for data of a resource stored on a blockchain;

determining, via a system smart contract running on a blockchain network of the blockchain, a blockchain peer, from among a plurality of blockchain peers of the blockchain network, which comprises encrypted data corresponding to the data of the resource requested by the requestor based on a resource identifier included in the request;

determining, via the system smart contract, that the requestor has permission to access the encrypted data based on access control rules that are embedded within logic of the system smart contract;

dynamically creating, via the system smart contract, a temporary ad hoc smart contract for the requestor and the determined blockchain peer only from among the plurality of blockchain peers which provides temporary access to a decryption key of the blockchain peer to the requestor to enable the requestor to decrypt the encrypted data from the blockchain peer;

installing the temporary ad hoc smart contract on the blockchain peer; and terminating the temporary ad hoc smart contract in response to the requestor receiving the decryption key.

15. The non-transitory computer readable storage medium of claim 14, wherein the method further comprises forwarding the decryption key to the requestor, responsive to determining the requestor has access permissions to access the obfuscated blockchain transaction information.

16. The non-transitory computer readable storage medium of claim 14, further comprising storing the decryption key off the blockchain.

17. The non-transitory computer readable storage medium of claim 14, wherein the access control rules are based on anonymous transaction certificates which manage access to resources stored on the blockchain.

18. The non-transitory computer readable storage medium of claim 14, wherein the encrypted data is encrypted before being stored on the blockchain based on a policy stored in the smart contract.

19. The non-transitory computer readable storage medium of claim 14, wherein the method further comprise terminating the temporary ad hoc smart contract after the requestor accesses the encrypted data on the blockchain.

* * * * *